C. Waste,
Hay Loader.
No. 101,233.
2 Sheets. Sheet 1.
Patented June 14, 1870.
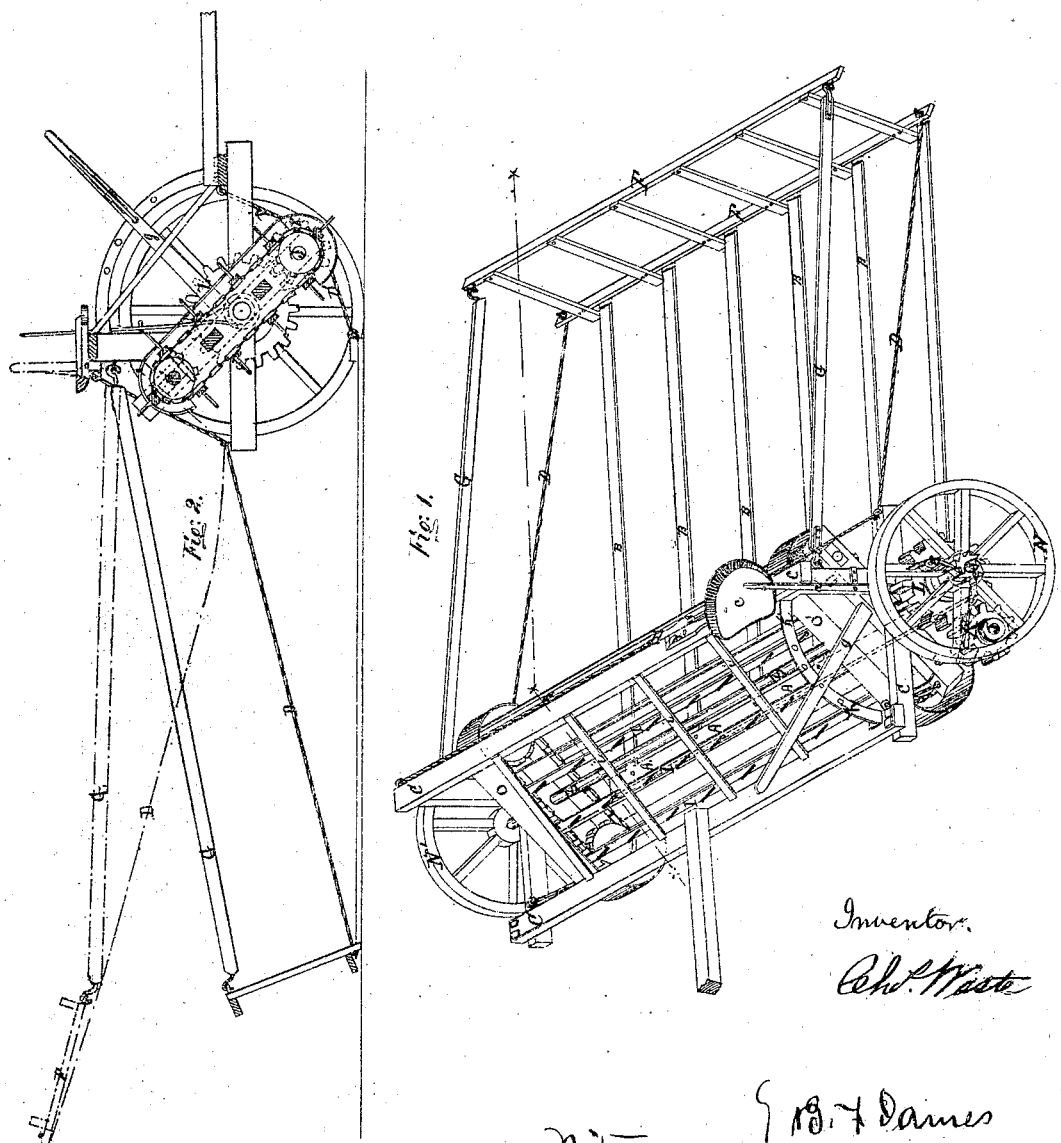
Inventor.
Chs. Waste
Witnesses.
B. F. Dames
A. McCallum

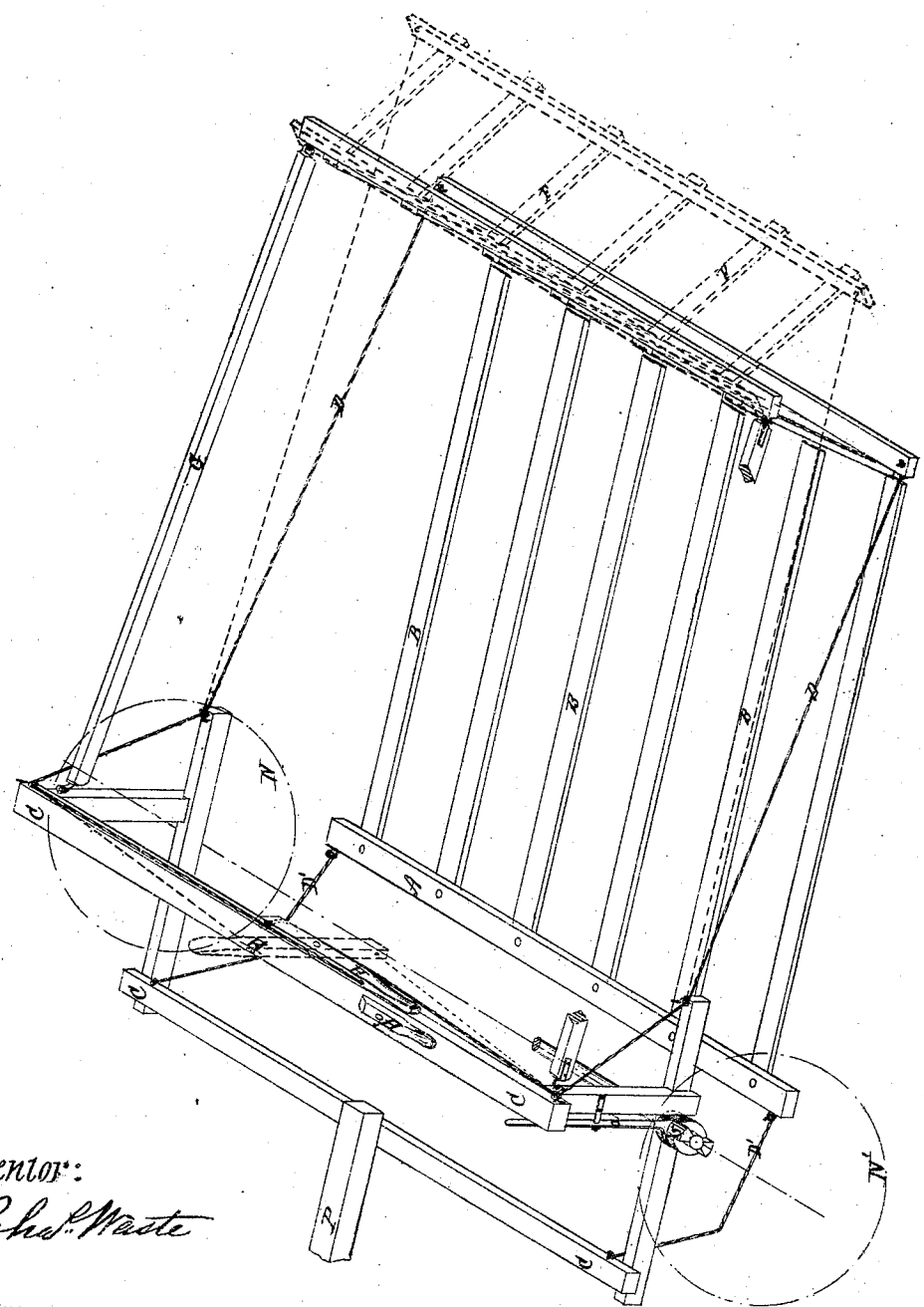

United States Patent Office.

CHARLES WASTE, OF GALESBURG, ILLINOIS.

Letters Patent No. 104,233, dated June 14, 1870.

IMPROVEMENT IN HAY-GATHERER.

The Schedule referred to in these Letters Patent and making part of the same

*To all whom it may concern:*

Be it known that I, CHARLES WASTE, of the city of Galesburg, county of Knox and State of Illinois, have invented a new and useful Improvement in "Hay-Carriers;" and I do hereby declare the following to be a full, clear, and exact description of the construction and operation of the same, reference being had to the annexed drawing making a part of this specification.

My invention consists in the construction of a hay-carrier, the bottom of which is composed of a transverse strip or head, in the rear of which, and attached thereto, either rigidly or by pivots, are slats, having no connection with each other, except as each is attached to the head, and having open spaces of proper width between them.

The rear of said carrier is constructed in the form of a gate, and is held and connected to the forward part of the machine while loading and drawing to the place of deposit, with its lower side forward of its upper side, giving it an angle of forty-five degrees, more or less; and, when the hay is to be discharged from the carrier, its lower side is released, allowing it to swing back.

My invention further consists in the connection and combination of such a carrier with a revolving elevator in front of the carrier, so arranged that it may elevate and deposit the hay upon said carrier.

Also, in pivoting centrally the elevator upon the axle of the driving-wheel.

The object of my invention is as follows:

The elevator is to raise the hay, either raked or unraked, and deposit it upon the carrier.

The open spaces between the slats allow the hay to rest sufficiently upon the ground or stubble, so that the friction thereon will force it back compactly upon the carrier, and, when desired, cause it to be discharged from the carrier.

The slats in the bottom prevent the hay from rolling under at the front, and thus prematurely discharging the load.

The head in front holds the slats in position, and, being located in front, instead of toward the rear, or at the rear, it offers no obstruction to the free discharge of the hay from the carrier.

The gate holds the hay upon the carrier while loading and drawing to the place of deposit.

The position of the gate while loading and drawing allows the hay to rest sufficient weight upon it to prevent its raising by the backward pressure of the hay, and allowing the load thus prematurely to be discharged.

Releasing the lower side of the gate allows it to ride up onto and over the hay upon the carrier, thus discharging the load.

Pivoting the elevator, as described, allows its lower edge to be raised or lowered to conform to the ground, and to rise over obstructions, and, at the same time, its operation continues perfect.

The object of the machine is to gather hay rapidly and easily from the field, and deposit it at the stack or barn within a moderate distance.

In the drawing—

Sheet 1, Figure 1, represents a perspective view of the whole working machine, the carrier, the elevator, and the frame to which the elevator and carrier are attached.

Figure 2 is a sectional view of the same, showing the carrier upon the ground, its connection with the frame and elevator, the arrangement of the elevator, and the position the gate assumes when it is desired to discharge the hay at any point desired, such as the stack or barn.

Sheet 2, Figure 3, shows, on a larger scale, the construction of the carrier, and its connection with the frame-work on the wheels, and the levers used for holding and releasing the lower side of the gate, in order to discharge the hay when desired.

The carrier in itself is composed of two parts, the bottom, composed of the head A and slats B B, &c., and the gate at the rear end of the slats.

The bottom of the carrier is composed of a transverse strip or head, A, and in the rear of which, and attached, either rigidly or by pivots, thereto, are slats B B B B B B, as shown in fig. 3, sheet 2.

I prefer to use these slats as shown and described, but I do not confine myself to their use. Rope, strips of metal, or other suitable material, may be used, and they may also be secured to the frame of the machine, individually or in any convenient manner, without the use of the head A.

Spaces are left between these slats, so that the hay resting upon them is caused to be forced back by coming in contact with the stubble or ground, and no other connection is required or practicable than that shown in the drawing, to wit, the connection to the head A, the object being to furnish a smooth, unresisting surface upon the slats, with no obstruction between or upon them, that the hay may slide off easily when it is desired to deposit the load that has accumulated upon the carrier.

In fig. 3, sheet 2, C represents a strong wooden frame, pivoted and supported upon the axle to which the wheels N N' are attached.

The head A of the carrier may be attached to the frame C by means of chains or cords D D, as shown in said figure, or in any way which will not obstruct the working of the machine.

At the rear end of the carrier is placed the gate F, which may be constructed of slats of wood or metal, both cross and vertical, and of sufficient strength to resist the backward pressure of the hay that may be deposited upon the carrier.

This gate is connected, at its upper side, and at either end, with the frame C, by means of the bars or rods G, as shown in figs. 1, 2, and 3.

The lower side of said gate is also connected with the frame-work C by means of the cords D D', eyes 1 1 1 1, and the lever H, and this connection is so made that the lower side of the gate F will be forward of its upper side, giving it an angle of forty-five degrees, more or less, or, at least, sufficiently to prevent the force of the hay pressing against it from raising said gate.

It will be seen that the cords D D are attached to the lever H, the end of one to or near the handle of said lever, and the other cord at the opposite end of said lever, so that, by such mode of attachment of the cords to the lever, when the lever H is depressed, and lies horizontally with the frame-work C, as seen in fig. 3, it may be secured in that position by means of the trip-lever H', and thus the lower portion of the gate is held in position, and at the proper angle.

The trip-lever H', when turned at a right angle to lever H, covers a portion of the handle of the latter, and retains it in its horizontal position.

When the carrier is filled, the team, consisting of one or more horses, attached to the pole P, can draw the same to a stack or barn, and, when it is desired to deposit the hay at such points, the lever H' is turned, and lever H turned to a vertical or a reverse position to that formerly occupied, (see dotted lines in fig. 3,) thereby lengthening the cords D D, and allowing the gate F to swing backward and upward, there being no obstruction between or upon the slats B B, &c., to prevent the hay from sliding off the same, and the friction of the stubble or ground upon the hay lying between the slats will cause the same to be deposited at once.

The gate F, in the rear of the slats B, rides easily over the ground, and offers no obstruction to the forward movement of the machine.

The particular mechanism or device described for holding and releasing the lower side of the gate F—to wit, cords D D, eyes 1 1 1 1, lever H, and lever H'—is not essential to the working of the machine. Other equally good devices may be constructed, but it is essential that, by this or some equivalent device, the lower side of the gate F be held in position and released as described.

The hay to be gathered lies upon the ground, either in bows or spread, and in the above description of the connection of the carrier with the frame C and wheels N N, the hay must necessarily be pitched into or upon the carrier by hand-labor.

In sheet 1, fig. 1, is shown the connection of the carrier with a hay-elevating device, so that the work to be performed in gathering hay can be done with great rapidity, and most effectually.

This elevating device is composed of a suitable frame, that is supported and pivoted upon the axle t, in such a manner that it may be vibrated or turned from a nearly perpendicular to a horizontal position, and is so geared to the driving-wheel on the axle M that, in any position it is caused to assume, the revolving motion of the elevator is continued at will.

To this frame the shafts J J' are attached by suitable bearings or boxes, which hold them, and in which they revolve.

Near the ends of these shafts are fitted sprocket-wheels, around which endless chains revolve, to which chains slats are attached, having on their outer sides, at suitable distances, pins or teeth, of wood or other material, inserted.

The shaft J, at one end, extends beyond the frame referred to, and has keyed upon its end the cog-wheel K, which engages with a similar and larger gear-wheel, L, that plays loosely upon the axle M.

This wheel L is engaged with the axle M by means of a clutch, b, operated by the lever a, which, when down, and motive power applied at P, will cause the lifting device to revolve, and the teeth on the slats referred to, coming in contact with the hay upon the ground, causes the same to be lifted and raised up and over the head A, and is deposited upon the carrier.

The elevator is controlled in its movements for adjusting to the ground by means of the lever g, which is firmly secured to the frame of the elevator, and, moving at its upper end upon a segment connected with the frame C, is held in any desired position by means of holes in said segment, into which a spring-pin attached to the upper portion of said lever is forced.

By depressing the lever referred to, the elevator is brought near to the ground, so that the teeth upon the slats come in contact with the hay, and raise or lift the same.

By raising the lever aforesaid, the elevator is so adjusted and raised as to pass over the ground, or any obstacle that may intervene, while drawing the accumulated load within the carrier to a stack or barn.

A driver's seat, c, is placed upon the frame C, in the manner shown, and in such close proximity to all the levers herein described as to be easily and readily manipulated by the driver, as required, in successfully operating the machine.

On the forward portion of the frame C are fastened the slats i i i i, which prevent the hay, as it passes up with the elevator, from falling forward upon the machine or ground.

Shields O O are placed over the ends of the slats, the chains, and sprocket-wheels of the elevator, as shown in fig. 1, to prevent the hay being entangled in the elevator, and to assist in dividing the hay drawn up by the elevator from that left on the ground at the side of the machine.

The ground-wheels N N are loose upon the axle M, and on the axle M, outside the wheels N N, are keyed ratchet-wheels e; and upon the wheels N N are pawls f, so that the wheels N N, by the pawls f and ratchets e, communicate their motion to the axle M when moving forward; and, when the machine is turning to the right or to the left, the wheel upon the outside circle gives its motion to the axle M.

What I claim as my invention, and desire to secure by Letters Patent, is—

1. The combination of the head A, slats B B, and gate F, all constructed, arranged, and operating as described, so that, while the same is drawn forward, resting upon the ground, the hay deposited thereon is, by the action of the ground or stubble, pressed to the rear, and discharged from the carrier, in the manner specified.

2. The gate F, constructed as herein described, and held in position by means of the rods G G and cords D D, connecting the same with the frame C and lever H, so that, while the carrier is being loaded, an inclined position is given to said gate, in the manner and for the purpose herein specified.

3. The combination of the head A, slats B B, &c., and gate F, with the lever H and cords D D, constructed and arranged as described, so that the lower side of the gate F can be automatically released, and brought back to its original position by means of the lever H and cords D D, substantially in the manner and for the purpose herein specified.

4. The combination and arrangement of the frame C and elevator I, pivoted centrally upon the axle M, in the manner and for the purpose herein specified.

5. The combination of an adjustable elevator with the frame C (both pivoted upon the same axle) and the hay-carrier A, B B, &c., and F, substantially in the manner and for the purpose set forth.

CHAS. WASTE.

Witnesses:
B. F. JAMES,
A. McCALLUM.